United States Patent [19]

Sauer et al.

[11] Patent Number: 4,990,168
[45] Date of Patent: Feb. 5, 1991

[54] RECOVERY OF CARBON DIOXIDE FROM A CARBON DIOXIDE PLANT VENT GAS USING MEMBRANES

[76] Inventors: Richard A. Sauer, 5601 Quincy St., Hinsdale, Ill. 60521; Joseph E. Paganessi, 31-35 Avenue Thierry, Ville d'Avray, France

[21] Appl. No.: 380,380
[22] Filed: Jul. 17, 1989
[51] Int. Cl.⁵ .................................................. F25J 3/02
[52] U.S. Cl. .......................................... 62/24; 55/16; 55/158
[58] Field of Search ................... 55/16, 158; 62/24, 18

[56] References Cited

U.S. PATENT DOCUMENTS

| | | | |
|---|---|---|---|
| 4,130,403 | 12/1978 | Cooley et al. | 55/16 |
| 4,466,946 | 8/1984 | Goddin, Jr. et al. | 55/16 |
| 4,492,593 | 1/1985 | Diaz | 62/18 |
| 4,602,477 | 7/1986 | Lucadamo | 55/158 |
| 4,639,257 | 1/1987 | Duckett et al. | 55/16 |
| 4,772,295 | 9/1988 | Kato et al. | 55/16 |

OTHER PUBLICATIONS

Kirk-Othmer, Encyclopedia of Chemical Technology, Third Edition, vol. 12, (New York, 1980), pp. 492-517.

*Primary Examiner*—Ronald C. Capossela
*Attorney, Agent, or Firm*—Oblon, Spivak McClelland, Maier & Neustadt

[57] ABSTRACT

A process for recovering $CO_2$ from a $CO_2$ liquifaction plant vent gas, which comprises feeding vent gas from a $CO_2$ liquifaction plant to a first semi-permeable gas separation membrane through which and at a pressure at which $CO_2$ is capable of diffusing therethrough, to form a $CO_2$-enriched permeate, and then returning the $CO_2$-enriched permeate to a feed side of said $CO_2$ liquifaction plant at a pressure capable of effecting the same.

13 Claims, 3 Drawing Sheets

RECOVERY OF CARBON DIOXIDE FROM A CARBON DIOXIDE PLANT VENT GAS USING MEMBRANES

BACKGROUND OF THE INVENTION

1. Field of the Invention

The present invention pertains to a passive membrane system which may be used to recover carbon dioxide from a carbon dioxide plant vent gas stream.

2. Description of the Background

Depending upon whether a gas mixture contains carbon dioxide ($CO_2$) in a high or low amount, a variety of techniques have been used to separate $CO_2$ from the mixture. For example, when the amount of $CO_2$ present in the gas mixture is low, and purification cannot be achieved directly by cooling and partial condensation, it is possibly to scrub the gas mixture with a suitable solvent to dissolve the $CO_2$, and then to strip the $CO_2$ from the solution so obtained. The carbon dioxide obtained can then be compressed, dried, cooled and further purified by partial condensation or distillation.

When the gas mixture contains a high amount of $CO_2$, however, the gas mixture may be compressed and then dried by absorption or other means. Finally, after removing undesirable impurities such as sulfur containing compounds, the mixture is cooled and after distillation $CO_2$ is obtained as a bottoms product. Unfortunately, the overhead product of the distillation column will always contain a significant amount of $CO_2$ which is inevitably wasted. This problem is particularly acute in conventional $CO_2$ liquifaction plants.

In a typical $CO_2$ liquifaction plant, a significant percentage of the $CO_2$ feed is lost as stripper vent gas. For example, in a 200 ton/day $CO_2$ liquifaction plant, about 10 to 15% of the $CO_2$ feed is lost. The composition of this dry waste gas steam is usually 75% or more of $CO_2$ with the remainder being $N_2$, $O_2$, $H_2$, and $CH_4$ with trace amounts of $NH_3$, CO and sulfur containing compounds.

In order to address this problem, at present, carbon dioxide is recovered from gas mixtures by subjecting the gas mixture to membrane separation, recovering from the membrane separation a permeate having a carbon dioxide concentration between the equilibrium concentration and about 98% by volume and then distilling the permeate at subambient temperature above the freezing temperature of the permeate and recovering carbon dioxide as a liquid bottoms product of the distillation.

The above conventional process is described in U.S. Pat. No. 4,639,257. In this process, a distillation step is required and the only energy savings available is attained by recycling the overhead stream from the distillation step to the membrane separation step.

The process of U.S. Pat. No. 4,639,257 accomplishes the recovery of carbon dioxide by first directing a gas mixture through a membrane and thereafter distilling the permeate in a cryogenic unit. The process is modified depending upon whether the carbon dioxide is present in the gas mixture in a high concentration or in a concentration which is not greater than the equilibrium concentration at the freezing temperature of the mixture.

When carbon dioxide is present in the lesser amount, the gas mixture is subjected to membrane separation and is then distilled at sub-ambient temperature to recover substantially pure carbon dioxide as a liquid bottoms product of the distillation. In some cases, the overhead stream from the distillation is recycled to the membrane as noted above.

When carbon dioxide is present in a high concentration, however, the gas mixture is distilled at sub-ambient temperature in a distillation column, and substantially pure carbon dioxide is recovered as a liquid bottoms product of the distillation. The overhead stream from the distillation is warmed to approximately ambient temperature, and is then directed over a membrane, and the resulting carbon-dioxide rich permeate is recycled to the distillation column.

Notably, in the above process, the warming step is an essential step in the process as this patent teaches that the tail gas from the distillation must be warmed before contact with the membrane separation unit.

Thus, such a separation technique requires an external energy source for operation. This renders the process economics very unfavorable.

U.S. Pat. No. 4,595,405 discloses a process for the production of nitrogen using a cryogenic separation unit and one or more membranes, however, cryogenic separation units in combination with membranes were known prior to U.S. Pat. No. 4,595,405. See, for example, U.S. Pat. No. 4,180,553 and 4,181,675.

U.S. Pat. No. 4,595,405 discloses a process wherein air is fed to a cryogenic separation unit, and a portion of the output from the unit is then fed to a membrane unit to form a nitrogen-rich gas stream. Thereafter, the nitrogen-rich stream is returned to the cryogenic unit, and a purified nitrogen-rich stream is recovered therefrom.

This patent discloses that the use of the membrane provides "an additional degree of freedom" to adjust the process parameters for further optimization. This only appears to mean, however, that the pressure of the various streams no longer must be determined by ambient pressure but may be set at substantially any desired level. However, this patent is clearly not specifically addressed to the separation of carbon dioxide from vent gas mixtures. Further, the disclosed process does not use the existing temperatures and pressures of a carbon dioxide plant in separating carbon dioxide from vent gas mixtures.

Thus, it would be extremely desirable if a method for separating $CO_2$ from a gas mixture could be effected without the use of an external energy source for a warming step and in an economically advantageous manner using the temperature and pressure of the $CO_2$ plant It would also be extremely desirable if vent gas which is lost from conventional $CO_2$ liquifaction plants could be treated to recover $CO_2$ in a completely passive manner using the pressure of the waste gas stream.

SUMMARY OF THE INVENTION

Accordingly, it is an object of the present invention to provide a method for recovering $CO_2$ from the waste gas stream of a $CO_2$ liquifaction plant without the use of an external energy source.

It is also an object of the present invention to provide a method for recovering $CO_2$ from the waste gas stream of a $CO_2$ liquifaction plant which can allow the recovered $CO_2$ to be recycled back to the feed side of the liquifaction plant at a purity compatible with the feed gas stream to the plant.

Moreover, it is also an object of the present invention to provide a $CO_2$ recovery process which is completely passive using the pressure of the waste gas stream from a $CO_2$ liquifaction plant.

These objects and others which will become apparent are provided by a process for recovering $CO_2$ from a $CO_2$ liquifaction plant vent gas, which entails feeding vent gas from a $CO_2$ liquifaction plant to a semi-permeable gas membrane through which and at a pressure at which $CO_2$ is capable of diffusing therethrough, to form a $CO_2$-enriched permeate, and then returning the $CO_2$-enriched permeate to a feed side of said $CO_2$ liquifaction plant at a pressure capable of effecting the same.

DETAILED DESCRIPTION OF THE PREFERRED EMBODIMENTS

The process of the present invention utilizes a semipermeable gas membrane to recover carbon dioxide from a waste gas stream of a $CO_2$ liquifaction plant Notably, the recovery systems of the present invention are completely passive in that they contain no moving parts and use only the pressure energy of the waste gas stream to effect separation of $CO_2$ from the gas mixture. Further, the recovery systems of the present invention are advantageously operated at about the $CO_2$ plant temperature in order to enhance the $CO_2$/impurity separation and to improve process economics. Notably, an excellent degree of separation is achieved by the present invention inasmuch as the membrane is operated at the cold temperature of the off-gas stream. The enriched $CO_2$ strain that is produced by the membrane is then recycled back to the feed side of the liquifaction plant at a purity compatible with the feed gas stream to the plant.

In accordance with the present invention, it has been found to be quite advantageous to use a membrane to achieve separation of the $CO_2$ from the gas mixture since the waste gas stream is already pressurized. Hence, no external energy source is required in order operate the $CO_2$ recovery systems of the present invention. Further, as noted above, it is surprisingly observed that at low temperature the separation factors between $CO_2$ and other gases present are quite high, resulting in a higher product purity than if the gas mixture were at room temperature.

Figure 1:
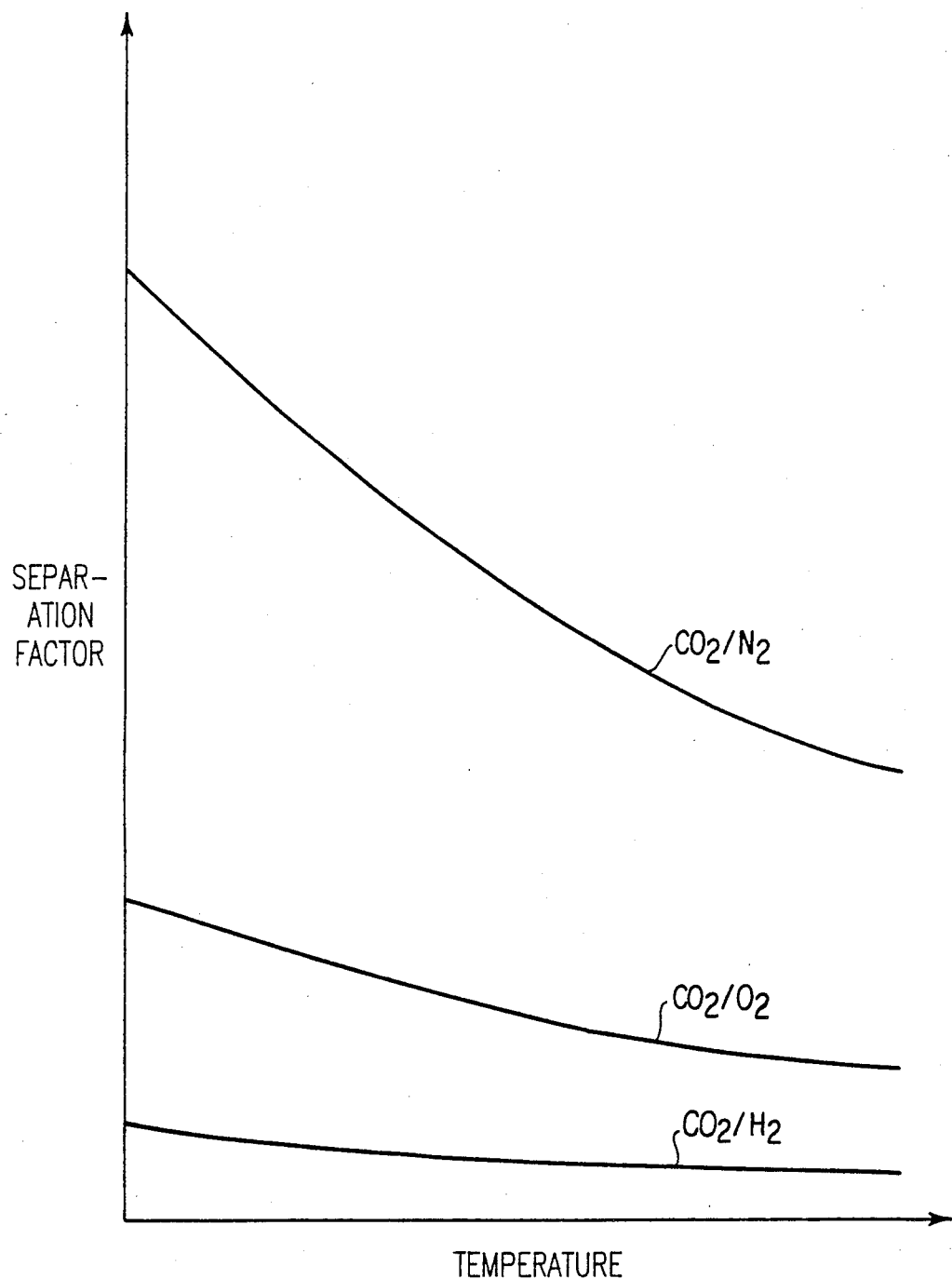
FIG. 1 illustrates the effect of temperature on gaseous separation factors for mixtures of $CO_2/N_2$, $CO_2/O_2$ and $CO_2/H_2$.

FIG. 1 illustrates the effect of temperature on various separation factors for gaseous mixtures of $CO_2/N_2$, $CO_2/O_2$ and $CO_2/H_2$. With decreasing temperature, an improved separation factor is obtained. Thus, no external cooling of the gas is required in the present invention to achieve these high separation factors inasmuch as the vent gas temperature is already at low temperature, i e., about $-2°$ F. Hence, the present $CO_2$ recovery units enjoy very favorable process economics.

Figure 2:
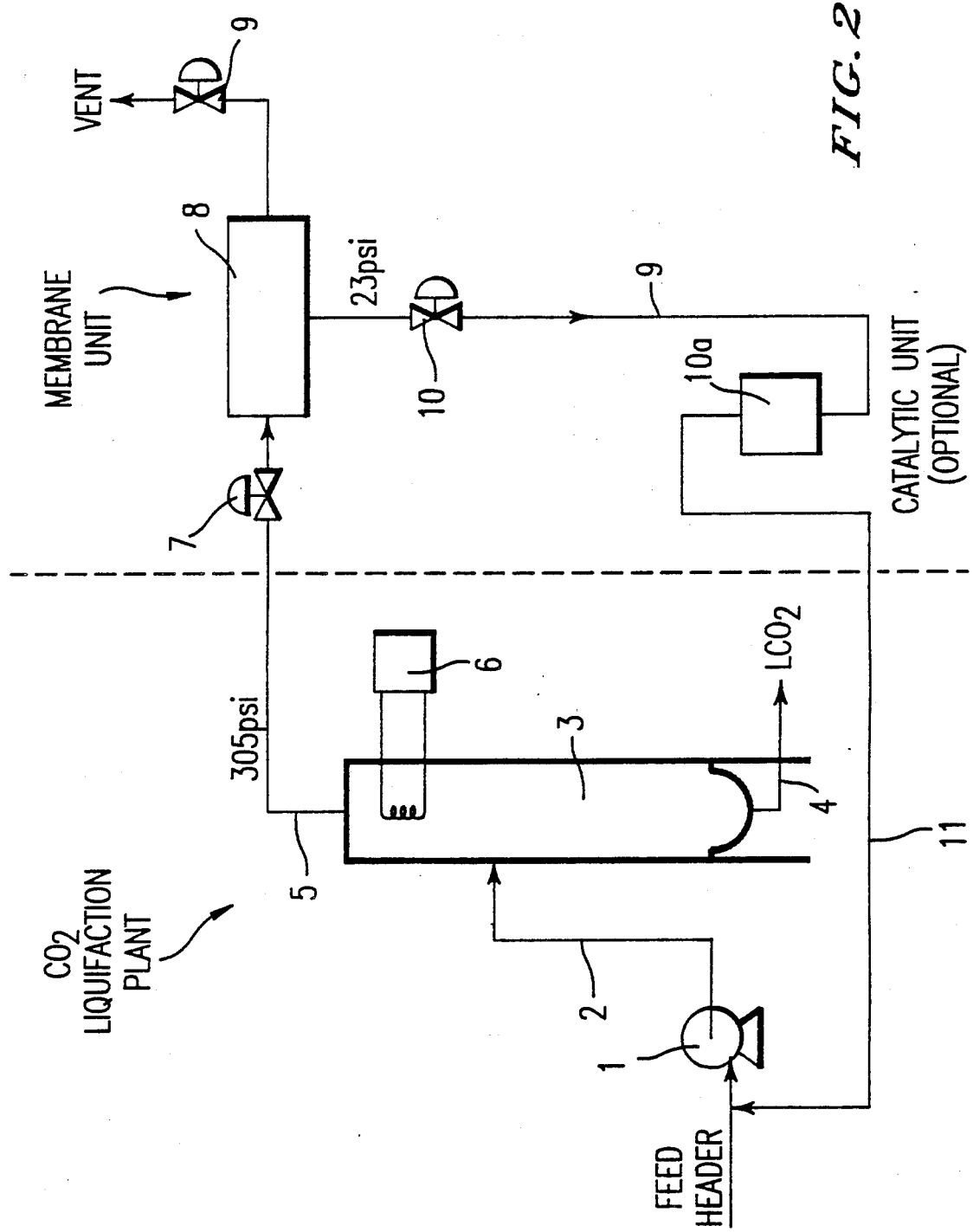
FIG. 2 illustrates a single-stage membrane $CO_2$ recovery unit in accordance with the present invention.

A single-stage membrane recovery unit of the present invention is illustrated in FIG. 2. This recovery system and the operation thereof will now be described.

The carbon dioxide-containing feed gas mixture is provided through a feed header pipeline to a compressor 1 and then the compressed mixture is fed via pipeline 2 to condenser 3 which contains refrigeration unit 6, an exit 4 at the bottom of the condenser for removal of liquid $CO_2$, and pipeline 5 through which the overhead stream or vent gas stream passes at elevated pressure through pressure regulator 7 to separation membrane 8.

Generally, the term "elevated pressure" means that the pressure of the vent gas is sufficient to facilitate permeation of $CO_2$ through the separation membrane. Typically, however, pressures in the range of about 260–315 psia are used. This will be explained in more detail below.

The non-permeating waste gas is exhausted through a vent or pressure regulator 9 to the atmosphere.

The $CO_2$-enriched permeating gas passes out of the membrane shell and is then recycled via conduit 11 to the feed side of the liquifaction plant for reprocessing at a purity compatible to the feed concentration to the plant.

Additionally, the purity of the $CO_2$ obtained may be further increased by the addition of a catalytic burn-out system 10 in the permeate return line. Quite advantageously, it has been found that the passive catalytic unit reacts the remaining combustibles with oxygen in the product gas to raise the purity to above 99%. For this purpose, any commercially available catalytic unit will suffice.

In the above single-stage recovery process, the vent gas is typically fed from the condenser at an elevated pressure in the range of about 260–315 psia and at a low temperature in the range of about $-10°$ F. to about $5°$ F. However, it is most desirable if a pressure of about 300–310 psia is used, and a temperature of about $-5°$ F. to $0°$ C. is used. Most often, however, is used a pressure of about 305 psia, and a temperature of about $-2°$ F.

Additionally, prior to membrane separation, if desired, the gas mixture can be filtered to remove impurities.

Further, a pressure regulator is advantageously used to provide a constant feed pressure on the membrane unit. Also, a back pressure regulator in the membrane vent line will maintain adequate pressure on the module feed side. Usually, a pressure of about 305 psia is maintained at the pressure regulator 7 input, and a pressure of about 123 psia is maintained at the module feed side. Typically, a pressure in the range of about 15 to 40 psia is maintained on the permeate side and in the feed line returning to the $CO_2$ liquifaction plant. It is essential only that the pressure of the gas at this stage have sufficient pressure to be returned to the feed side of the $CO_2$-liquifaction plant. Non-permeating gas exits the membrane unit and is exhausted to the atmosphere.

Although FIG. 2 illustrates the presence of pressure regulator 10 and catalytic unit 10a, these features are optional.

Figure 3:
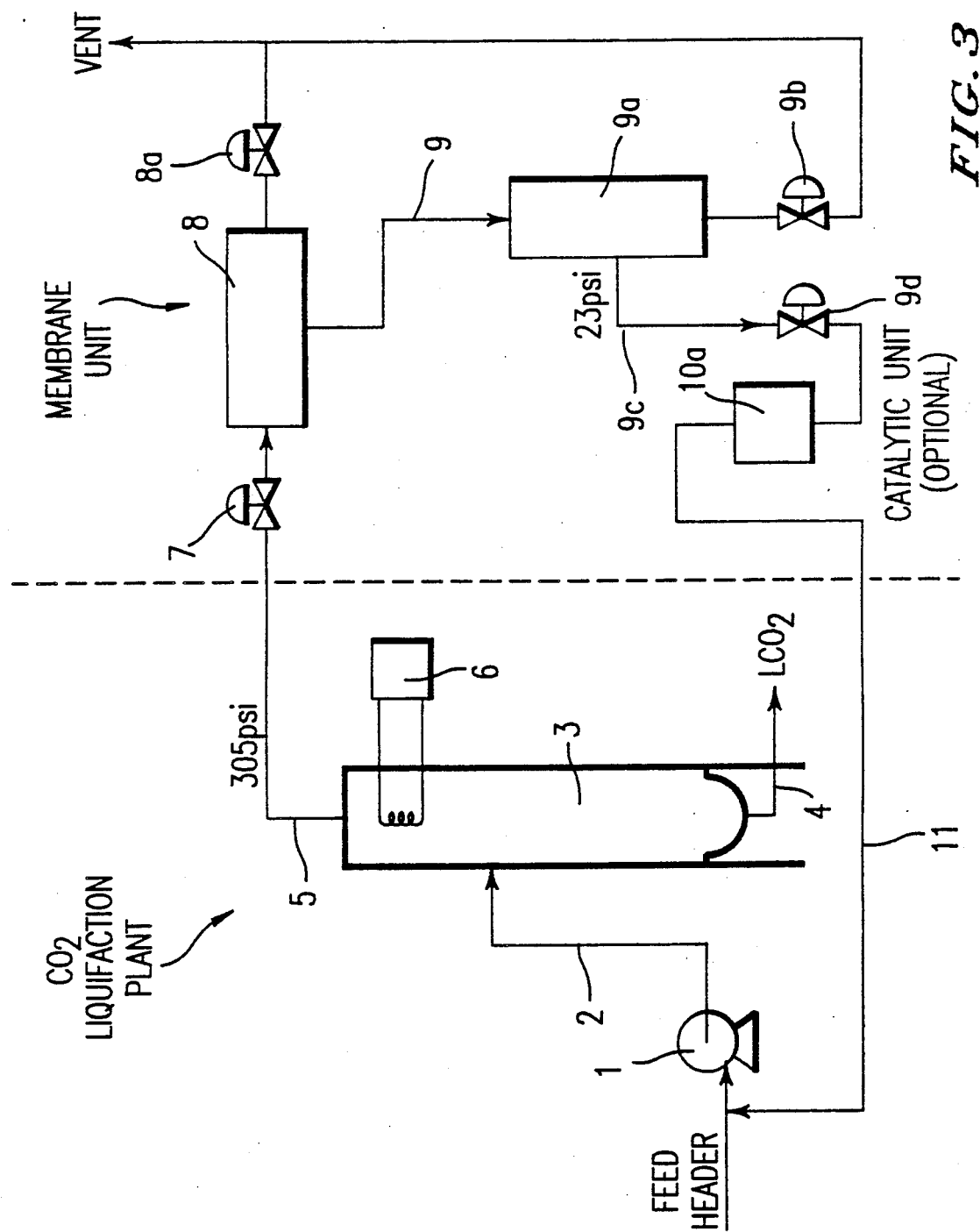
FIG. 3 illustrates a dual-stage membrane $CO_2$ recovery unit in accordance with the present invention.

In FIG. 3, a dual-stage membrane $CO_2$ recovery unit is illustrated From FIG. 3, it is seen that membranes 8 and 9a are positioned in series such that the permeate from the first stage becomes the feed to the second stage. In this recovery system, a pressure regulator and two back pressure regulators maintain gas pressures at the desired levels within the system. Pressures in this system are in accordance with the pressures used in the single-stage system. For example, the permeate pressures in the single-stage and dual-stage recovery systems are maintained in a range of about 15 to 40 psia. It is more preferred, however, to maintain these pressures within the range of about 15 to 30 psia. Most often, however, the permeate pressure in the single-stage and dual-stage recovery systems is maintained at about 23 psia. In any event, in accordance with both single- and dual-stage recovery systems, it is sufficient if the permeate pressure is merely adequate to push the $CO_2$ product back to the feed side of the liquifaction plant.

In the dual-stage recovery system, the non-permeate streams from stage 1 and stage 2 are vented to the atmosphere.

In more detail, in FIG. 3, it is seen that the carbon dioxide-containing feed gas mixture is provided through a feed header pipeline to a compressor 1 and then the compressed mixture is fed via pipeline 2 to condenser 3 which contains refrigeration unit 6, an exit 4 at the bottom of the condenser for removal of liquid $CO_2$, and pipeline 5 through which the overhead stream or vent gas stream passes at elevated pressure through pressure regulator 7 to separation membrane 8. The non-permeating gas is vented to the atmosphere through pressure regulator 8a. The term "elevated pressure" is defined hereinabove.

The permeating gas from the first membrane 8, which is enriched in $CO_2$, is then passed through pipeline 9 to the second separation membrane 9a. The non-permeating gas from this membrane is vented to the atmosphere via pressure regulator 9b.

Although FIG. 3 illustrates the presence of pressure regulator 9b and catalytic unit 9d, these features are optional.

The permeating gas from the second membrane, which is further enriched in $CO_2$, is then passed through pipeline 10 at a pressure sufficient to push the highly $CO_2$ enriched gas back to the feed side of the $CO_2$ liquifaction plant. Typically, pressures on the permeate side of the second membrane are in the range of about 15 to 40 psia, preferably 15 to 30 psia. Most often, however, a pressure of about 23 psia is used.

In accordance with the present invention, any semipermeable gas membrane may be used as the separation membrane or membranes provided that it exhibits sufficient permeability to $CO_2$ and has a sufficient separation factor with respect to impurity gases. Although any such membrane may be used, a membrane having a bundle of hollow fibers is advantageously used as it has an excellent surface area/volume ratio. This allows for more membrane to be fit into the geometry of the hollow fibers.

In order to illustrate the present invention, reference will now be made to the following Examples which are provided solely for purposes of illustration and are not intended to be limitative.

EXAMPLE 1

A test membrane consisting of a bundle of hollow fibers, with a bore side diameter of approximately 0.13 mm, was inserted into a pressure shell. A gas mixture containing $CO_2$ at high pressure was fed to the feed side of the membrane module which allowed fast permeating $CO_2$ to diffuse through the membrane into the lower pressure permeate side where it was recovered. The remainder of the slow permeating gas exited the module at high pressure from the end opposite the feed side and was vented. The operating limits of the membrane were a 200 psi maximum pressure differential with a $-20$ to $120°$ F. temperature range.

EXAMPLE 2

Using a pilot plant evaluation for a feed gas rate of 25,000 SCFH and a concentration of 75% $CO_2$, $CO_2$ recovery as a function of product gas recovery was determined using industrially sized membrane modules.

Using a single-stage recovery unit, a maximum $CO_2$ purity of greater than 99.5% at a low $CO_2$ recovery was obtained. The recovery increases rapidly as the product purity requirement decreases, however. At a $CO_2$ recovery of 75%, a 98% pure $CO_2$ product stream is produced in a single membrane stage.

EXAMPLE 3

Further to Example 2, it is observed that when using a passive catalytic burn-out system with either the single- or dual-stage recovery system of the present invention to react the remaining combustibles and oxygen in the product gas, the purity of the resulting final product gas is raised to greater than 99%.

The above Examples illustrate several processes in accordance with the present invention. However, it is understood that many variations and modifications would be apparent to one skilled in the art which would be within the ambit of the present invention. For example, more than two separation units might be used instead of a catalytic burn-out unit, or a filtration system might be used to remove gaseous impurities prior to membrane separation.

Additionally, the present invention provides not only the processes described above but the various described apparati for practicing these processes.

The present invention provides an apparatus and a process for efficiently recovering $CO_2$ from a $CO_2$ plant vent gas using membranes, and without using moving parts, and without the input of energy. It is a passive system.

Generally, the membranes most advantageously used in accordance with the present invention are those made by DuPont which exhibit a surprisingly increased selectivity for $CO_2$ with decreasing temperature. This feature is, in itself, surprising inasmuch as for most membranes permeability for all gases increases with increasing temperature.

The preferred membranes of the present invention are those disclosed, for example, in U.S. Pat. Nos. 3,567,632; 3,822,202; 3,899,309 (and Reissue 30,351); 4,113,628; 4,705,540; 4,717,393; 4,717,394; and 3,775,361, which are each and all incorporated herein by reference in their entirety. However, the most preferred membranes are polyimide, polyaramid, polyester and polyamide membranes.

We claim:

1. A process for recovering $CO_2$ from a $CO_2$ liquefaction plant vent gas, said process consisting essentially of:
   (1) feeding said vent gas to at least a first semipermeable gas separation membrane to form a $CO_2$-enriched permeate and non-permeating gas;
   (2) venting said non-permeating gas to the atmosphere;
   (3) optionally passing said $CO_2$-enriched permeate from said first semipermeable gas separation membrane to a second semipermeable gas separation membrane;
   (4) optionally passing said $CO_2$-enriched permeate through a passive catalytic burn-out unit; and
   (5) passing said $CO_2$-enriched permeate to a feed-input of said $CO_2$ liquefaction plant.

2. The process according to claim 1, wherein said vent gas is fed to said first semi-permeable gas membrane at a pressure in the range of about 260 to 315 psia and at a temperature in the range of about −10° F. to 5° F.

3. The process according to claim 2, wherein said vent gas is fed to said first semi-permeable gas membrane at a pressure in the range of about 300 to 310 psia and at a temperature in the range of about −5° F. to 0° F.

4. The process according to claim 3, wherein said vent gas is fed to said first semi-permeable gas membrane at a pressure of about 305 psia and at a temperature of about −2° F.

5. The process according to claim 1, wherein the pressure at the first membrane feed side and permeate side is maintained by pressure regulators.

6. The process according to claim 1, wherein said pressure on the permeate side of said first membrane is in the range of about 15 to 40 psia.

7. The process according to claim 6, wherein said pressure on the permeate side of said first membrane is in the range of about 15 to 30 psia.

8. The process according to claim 7, wherein said pressure on the permeate side of said first membrane is about 23 psia.

9. The process according to claim 1, wherein said $CO_2$-enriched permeate from said first semi-permeable gas separation membrane is fed to a second semi-permeable gas separation membrane.

10. The process according to claim 1, wherein said $CO_2$-enriched permeate from said first semi-permeable gas separation membrane is fed to a passive catalytic burn-out unit.

11. The process according to claim 9, wherein said $CO_2$-enriched permeate from said second semi-permeable gas separation membrane is fed to a passive catalytic burn-out unit.

12. The process according to claim 1, wherein said semi-permeable gas membrane comprises a bundle of hollow fibers.

13. The process according to claim 12, wherein said semi-permeable gas membrane has an increased selectivity for carbon dioxide with decreasing temperature.

* * * * *